United States Patent [19]

Freeman et al.

[11] Patent Number: 5,531,934

[45] Date of Patent: Jul. 2, 1996

[54] METHOD OF INHIBITING CORROSION IN AQUEOUS SYSTEMS USING POLY(AMINO ACIDS)

[75] Inventors: Michael B. Freeman, Harleysville; William M. Hann, Gywnedd, both of Pa.; Yi H. Paik, Princeton, N.J.; Graham Swift, Blue Bell, Pa.

[73] Assignee: Rohm & Haas Company, Philadelphia, Pa.

[21] Appl. No.: 304,063

[22] Filed: Sep. 12, 1994

[51] Int. Cl.$^6$ .................... C11D 3/06; C11D 3/37
[52] U.S. Cl. .................. 252/390; 252/392; 252/394; 510/266; 510/335; 510/402
[58] Field of Search .............. 252/174.23, 174.24, 252/546, DIG. 2, 390, 392, 394

[56] References Cited

U.S. PATENT DOCUMENTS

| | | | |
|---|---|---|---|
| 4,534,881 | 8/1985 | Sikes et al. | 252/180 |
| 4,587,021 | 5/1986 | Wheeler et al. | 210/698 |
| 4,588,519 | 5/1986 | Kuhn | 252/389 R |
| 4,603,006 | 7/1986 | Sikes et al. | 252/180 |
| 4,868,287 | 9/1989 | Sikes et al. | 530/324 |
| 4,971,724 | 11/1990 | Kalota et al. | 252/390 |
| 5,051,401 | 9/1991 | Sikes | 514/7 |
| 5,260,272 | 11/1993 | Donachy et al. | 524/12 |
| 5,266,237 | 11/1993 | Freeman et al. | 252/542 |
| 5,306,429 | 4/1994 | Wood et al. | 210/698 |
| 5,328,631 | 7/1994 | Du Vosel et al. | 252/174.23 |
| 5,328,690 | 7/1994 | Sikes | 424/401 |
| 5,389,303 | 2/1995 | Wood et al. | 252/544 |
| 5,401,428 | 3/1995 | Kalota et al. | 252/49.3 |

FOREIGN PATENT DOCUMENTS

| | | |
|---|---|---|
| 451434 | 4/1990 | European Pat. Off. . |
| 511037 | 10/1992 | European Pat. Off. . |
| 513948 | 11/1992 | European Pat. Off. . |
| 561464 | 9/1993 | European Pat. Off. . |
| 592265 | 4/1994 | European Pat. Off. . |
| 612842 | 8/1994 | European Pat. Off. . |
| 4319798 | 12/1994 | Germany . |
| 9410282 | 10/1992 | WIPO . |
| 9416045 | 1/1993 | WIPO . |
| 6202 | 4/1993 | WIPO . |
| 4014939 | 7/1994 | WIPO . |

OTHER PUBLICATIONS

Corrosion Inhibition By Thermal Polyaspartate, Brenda J. Little and C. Steven Sikes, Chapter 21. 1991 No month available.

U.S. patent application Ser. No. 08/213,648, filed Mar. 16, 1994, For: Acid Catalyzed Process For Preparing Amino Acid Polymers, By: D. E. Adler, et al.

Primary Examiner—Paul Lieberman
Assistant Examiner—Michael P. Tierney
Attorney, Agent, or Firm—Kimberly R. Hild

[57] ABSTRACT

The present invention provides a method of inhibiting corrosion of ferrous metals in aqueous systems. The corrosion is inhibited by adding an effective amount of one or more poly(amino acids) to the aqueous system. Aqueous systems include for example water treatment systems and equipment used for detergent applications. The poly(amino acids) comprise a reaction product of at least one compound selected from amino acids, amic acids, ammonium salts of monoethylenically unsaturated dicarboxylic acids, ammonium salts of hydroxypolycarboxylic acids and combinations thereof.

In one embodiment the poly(amino acids) are added to detergent solutions to inhibit corrosion in equipment for detergent applications. In another embodiment, corrosion inhibitors comprising one or more homopolymers of amino acids and one or more pyrophosphates are added to aqueous systems to inhibit corrosion.

2 Claims, No Drawings

METHOD OF INHIBITING CORROSION IN AQUEOUS SYSTEMS USING POLY(AMINO ACIDS)

BACKGROUND

The present invention relates to a method of inhibiting corrosion of ferrous metals in an aqueous system. More particularly, the invention is directed to the use of one or more poly(amino acids) to inhibit corrosion.

Ferrous metals such as carbon steel and stainless steel are widely used in the construction of equipment associated with aqueous systems. By "aqueous systems" we mean equipment or process operations, containing ferrous metals, which are contacted with aqueous fluids on a regular basis. Typical aqueous systems include for example water treatment systems such as cooling water systems, boilers, heat exchange equipment, reverse osmosis equipment, oil production operations, flash evaporators, desalination plants, paper making equipment, steam power plants, and geothermal systems. Aqueous systems also include for example equipment used in detergent applications such as laundry machines and automatic dishwashing machines. A common problem in aqueous systems is that the aqueous fluids corrode the ferrous metals in the aqueous systems.

The corrosion of ferrous metals is believed to be caused by agents, such as oxygen, present in the aqueous fluid, which oxidize the ferrous metals.

The corrosion in aqueous systems can be accelerated by many factors. For example, contaminants such as cations, like magnesium and calcium, and anions, like sulfate and chloride, can increase the rate of corrosion. The rate of corrosion is also increased when aqueous systems are contacted with water from natural resources such as from sea, lakes, and rivers. It is believed that certain microorganisms in water from natural resources interact with the ferrous metals to accelerate corrosion.

Corrosion can also become more severe when the pH of the aqueous fluid is lowered, or when the temperature of the aqueous fluid is raised. Additionally, evaporation of water in aqueous systems, concentrates contaminants in the aqueous fluid, and can accelerate corrosion.

There may be several different types of corrosion encountered in aqueous systems. For example, aqueous systems may have uniform corrosion over the entire metal surface. The aqueous system may also have localized corrosion, such as pitting or crevice corrosion, where the corrosion is found only in certain locations on the ferrous metals.

Corrosion in aqueous systems can be a serious problem. The corrosion causes the ferrous metal to weaken and deteriorate. Eventually, if the corrosion is severe, the ferrous metal parts or possibly the entire aqueous system must be replaced. Replacement of parts or the aqueous system can be expensive and can also lead to a significant loss in operating time.

Corrosion inhibitors are commonly added to aqueous systems to mitigate corrosion of the ferrous metals. Common corrosion inhibitors include for example water soluble zinc salts, phosphates, polyphosphates, phosphonates, nitrates, molybdates, tungstates, silicates, ethanolamines, and fatty amines. Recently, it has been desired to use partially or completely biodegradable corrosion inhibitors in aqueous systems. For example, U.S. Pat. No. 4,971,724, to Kalota, hereinafter referred to as "Kalota" discloses the use of certain amino acids and certain homopolymers of amino acids such as aspartic acid and poly(aspartic acid) as corrosion inhibitors.

However, the amino acids and homopolymers of amino acids disclosed in Kalota are only effective as corrosion inhibitors in systems having a pH greater than 9.5 (25° C.). Below a pH of 9.5, the amino acids and homopolymers of amino acids in Kalota are disclosed to promote corrosion in comparison to systems having no corrosion inhibitor. Since many systems, such as cooling water systems have a pH lower than 9.5, it is desirable to provide corrosion inhibitors that are effective at a pH less than 9.5.

Additionally, some systems, such as oil production operations, use aqueous fluids where the pH varies depending on the location of the operation. For example, in oil production operations, downhole, or below ground, the aqueous fluid has typically a pH less than about 6. However topside, or above ground, the aqueous fluid often has a pH greater than 6. Therefore, it is desirable to develop corrosion inhibitors which work effectively over a wide range of pHs from 3 to 12.

In addition to the need to develop corrosion inhibitors which are effective over a wide range of pHs, there is also a desire to replace water soluble silicates which are currently being used in detergent applications as corrosion inhibitors. The water soluble silicates are problematic because they can cause processing problems when preparing detergent formulations used in detergent applications.

The problem addressed by the present invention to provide corrosion inhibitors which can replace water soluble silicate corrosion inhibitors in detergent applications. The present invention also addresses the problem of providing corrosion inhibitors which are effective over a wide range of pHs from 3 to 12.

Accordingly, the present invention provides corrosion inhibitors comprising poly(amino acids) which are useful in detergent applications to replace water soluble silicate corrosion inhibitors. The present invention also provides corrosion inhibitors comprising one or more homopolymers of amino acids and one or more pyrophosphates which are useful in aqueous systems operated over a wide range of pHs.

STATEMENT OF THE INVENTION

We have discovered a method of inhibiting corrosion in equipment used for detergent applications, comprising: adding to a detergent solution which contacts the equipment, an effective amount of one or more poly(amino acids); wherein the poly(amino acids) comprise a reaction product of at least one compound selected from the group consisting of: amino acids, amic acids, ammonium salts of monoethylenically unsaturated dicarboxylic acids, and ammonium salts of hydroxypolycarboxylic acids; wherein the detergent solution comprises at least one builder, at least one surfactant, and water; and wherein the corrosion inhibited is ferrous metal in the equipment.

In another embodiment of the present invention, we have discovered a method of inhibiting corrosion, comprising: adding to an aqueous system, an effective amount of one or more homopolymers of amino acids and one or more pyrophosphates; wherein the corrosion inhibited is ferrous metals in the aqueous system; and wherein the homopolymers comprise a reaction product of at least one compound selected from the group consisting of: amino acids, amic acids, ammonium salts of monoethylenically unsaturated dicarboxylic acids, and ammonium salts of hydroxypolycarboxylic acids; and wherein the homopolymers contain only one type of repeating unit.

DETAILED DESCRIPTION

The present invention relates to the use of poly(amino acids) in aqueous systems to inhibit corrosion. In one embodiment, the poly(amino acids) are used as corrosion inhibitors in equipment for detergent applications. In another embodiment, corrosion inhibitors comprising one or more homopolymers of amino acids and one or more pyrophosphates are used in aqueous systems. In an additional embodiment certain homopolymers are particularly effective in inhibiting corrosion in aqueous systems operated at pHs of 7.5 or less.

In one embodiment of the present invention one or more poly(amino acids) are added to detergent solutions to inhibit corrosion in equipment used for detergent applications. By "equipment used for detergent applications," we mean equipment such as for example laundry machines and automatic dishwashing machines, which are used to clean such articles as textiles, clothes, glasses, and dishes. By "detergent solution," we mean the aqueous fluid used to directly clean the articles in the equipment. The detergent solution typically contains one or more surfactants, one or more builders, water, and other components typically found in detergent formulations. The pH of the detergent solution solution is typically from 8 to 11. The term "detergent solution" is not meant to include cleaning solutions containing high (greater than 10,000 mg/l) concentrations of sodium hydroxide which are often used to clean metals.

The poly(amino acids) may be added directly to the detergent solutions. Additionally, the poly(amino acids) may be formulated into a solid or liquid detergent formulation which is then diluted with water to form the detergent solution. The detergent formulation may be prepared according to techniques well known to those skilled in the art. Typically, the detergent formulation will contain, for example, surfactants, builders, and inert diluents in addition to the poly(amino acids) useful in the present invention.

In a preferred embodiment of the present invention, the poly(amino acids) are used as corrosion inhibitors when the detergent solution is essentially free of water soluble silicates. The water soluble silicates are typically used in detergent formulations to inhibit corrosion. Water soluble silicates include for example alkali metal silicates, disilicates or metasilicates such as sodium silicate, sodium disilicate, or sodium metasilicate.

The concentration of the one or more poly(amino acids) added to the detergent solution is typically greater than 1 mg/l preferably from 3 to 1000 mg/l, and most preferably from 10 to 100 mg/l in the detergent solution.

The poly(amino acids) useful for inhibiting corrosion in equipment for detergent applications contain amide or peptide bonds as shown below in Formula I.

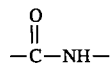

Formula I

The peptide linkages are typically formed from the reaction of compounds which contain a carboxylic acid group and an amino or ammonium group. For example, the poly(amino acids) may be formed from the reaction of one or more compounds selected from amino acids, amic adds, ammonium salts of monoethylenically unsaturated dicarboxylic acids, ammonium salts of hydroxypolycarboxylic acids or combinations thereof. Optionally, additional monomers may be reacted with the compounds used to form the poly(amino acids).

The term "poly(amino acids)," is meant to include hydrolyzed and non-hydrolyzed poly(amino acids). "Hydrolyzed polyamino acids" are anhydropolyamino acids which have been reacted or hydrolyzed with at least one common base or acid.

The term "poly(amino acids)" as herein defined is also meant to include homopolymers of amino acids and copolymers of amino acids.

By "homopolymers of amino acids" we mean that the poly(amino acids) have only one type of repeating unit, where the repeating unit is derived from the reaction of at least one compound. For example, a homopolymer of aspartic acid, poly(aspartic acid), may be formed from the reaction of either aspartic acid, maleamic acid, ammonium salts of maleic acid, or ammonium salts of malic acid. Poly(aspartic acid), for example, may also be formed from the reaction of aspartic acid and maleamic acid, or aspartic acid and ammonium salts of maleic acid.

By "copolymers of amino acids" we mean that the poly(amino acids) contain at least two different types of repeating units where the repeating units are derived from the reaction of at least two different compounds. This definition of copolymer includes copolymers of two amino acids, provided that the repeating units formed when the two amino acids are reacted are not the same. For example, a copolymer of aspartic acid and histidine may be formed from the reaction of aspartic acid and histidine. However, a copolymer is not formed when the at least two different compounds reacted produce the same repeating unit. For example, when maleamic acid and aspartic acid are thermally condensed, the poly(amino acid) formed is a homopolymer of aspartic acid.

The poly(amino acids) may also be random, sequential, or block polymers. By "sequential" we mean the repeating units are alternated in a pattern within the polymer. By "block" we mean that the same type of repeating units are connected adjacently together in groups within the polymer.

The poly(amino acids) are synthesized by techniques well known to those skilled in the art. For example, they may be synthesized by naturally occurring biochemical processes or by synthetic chemical processes. Suitable processes, for example, are disclosed in "The Peptide Bond" in The Peptides: Analysis, Synthesis, Biology, edited by E. Gross and J. Meienhofer, published by Academic Press, N.Y., Vol 1, pages 1–64 (1979). A preferred method for synthesizing the poly(amino acids) is disclosed in U.S. Pat. No. 5,318,145. U.S. Pat. No. 5,318,145 discloses a condensation reaction method for preparing poly(amino acids). The process utilizes heat and mild agitation to condense and polymerize the amino acids, amic acids, ammonium salts of monoethylenically unsaturated dicarboxylic acids, and optional additional monomers.

The polycondensation reaction typically proceeds by polymerizing these compounds to form an anhydropoly(amino acid) by driving off the water formed from intermolecular condensation of these compounds as well as from internal cyclization. Water liberated is removed during the reaction to drive the reaction toward completion.

The reaction may also be conducted in the presence of an acid catalyst such as for example, orthophosphoric acid and polyphosphoric acid. When an acid catalyst is used, the acid catalyst is typically added to the compounds to form a reaction mixture, and the reaction mixture is heated and agitated to form the anhydropoly(amino acid).

The anhydropoly(amino acid) which results from the polycondensation may be further reacted to form a hydrolyzed poly(amino acid). The hydrolysis reaction is conducted according to techniques well known to those skilled in the art such as with at least one common base or at least one common acid to form the corresponding water soluble salt or acid of the poly(amino acid). Preferably, the hydrolysis may be completely or partially carried out with any common alkali metal base, alkaline earth metal base, ammonium hydroxide, or low quaternary salt hydroxide, or combinations thereof to form the corresponding water soluble salt.

The weight average molecular weight (Mw), of the poly(amino acids) may be from 1000 to 100,000, preferably 2000 to 30,000, most preferably 3000 to 20,000 as determined by aqueous gel permeation chromatography (GPC) using as a standard 4500 Mw poly(acrylic acid).

Amino acids, which may be reacted to form the poly(amino acids) include for example, glycine, alanine, valine, leucine, isoleucine, phenylalanine, tyrosine, tryptophan, serine, threonine, aspartic acid, glutamic acid, asparagine, glutamine, lysine, arginine, histidine, methionine, cystine, cysteine, proline, hydroxyproline, β-alanine, phosphoserine, hydroxylysine, ornithine, citrulline, homocysteine, cystathionine, 4-aminobutyric acid, or combinations thereof. Preferably, the poly(amino acid) is formed from the reaction of at least one amino acid selected from glycine, alanine, leucine, phenylalanine, tyrosine, tryptophan, aspartic acid, glutamic acid, lysine, arginine, histidine, serine, β-alanine, 4-aminobutyric acid, or combinations thereof. More preferably, the poly(amino acid) is formed from the reaction of at least one amino acid selected from aspartic acid, lysine, arginine, histidine, 4-aminobutyric acid, phenylalanine, or combinations thereof.

Amic acids which may be reacted to form the poly(amino acids) are the monoamides of monoethylenically unsaturated dicarboxylic acids. Suitable amic acids include for example the monoamides derived from ammonia or primary amines and the acid anhydride, ester or acyl halide of monoethylenically unsaturated dicarboxylic acids. Preferably, the amic acids are maleamic acid (the monoamide of maleic acid), methylenesuccinamic acid (the monoamide of itaconic acid), methylene, glutaramic acid or the monoamides of mesaconic acid, methylenemalonic acid, fumaric acid, citraconic acid, aconitic acid, alkylmaleic acids, alkenylsuccinic acids, or combinations thereof. The most preferred amic acids are maleamic acid, methylenesuccinamic acid, or combinations thereof.

Ammonium salts of monoethylenically unsaturated dicarboxylic acids which may be reacted to form the poly(amino acids) are the partial or complete ammonium salts of monoethylenically unsaturated dicarboxylic acids. Suitable ammonium salts of monoethylenically unsaturated dicarboxylic acids include the partial or complete ammonium salts of maleic acid, itaconic acid, mesaconic acid, methylenemalonic acid, fumaric acid, citraconic acid, aconitic acid, alkylmaleic acids, alkenylsuccinic acids or combinations thereof. Preferred ammonium salts of monoethylenically unsaturated dicarboxylic acids are the ammonium salts of maleic acid.

Ammonium salts of hydroxypolycarboxylic acids which may be reacted to form the poly(amino acids) are the partial or complete ammonium salts of hydroxypolycarboxylic acids having at least one hydroxy group and two or more carboxylic acid groups. Suitable ammonium salts of hydroxypolycarboxylic acids include for example the ammonium salts of citric add, isocitric acid, mucic acid, tartaric acid, or malic acid. Preferred ammonium salts of hydroxypolycarboxylic acids are the ammonium salts of citric acid or malic acid.

Optional additional monomers may be reacted with the compounds used to form the poly(amino acids). Optional monomers include for example carboxylic acids, hydroxycarboxylic acids, alcohols, alkoxylated alcohols, amines, alkoxylated amines, lactones, or lactams, or combinations thereof.

Carboxylic acids useful as optional additional monomers have at least one carboxylic acid group and may be saturated or ethylenically unsaturated. Suitable carboxylic acids include for example formic acid, acetic acid, propionic acid, butyric acid, valeric acid, lauric acid, palmitic acid, stearic acid, behenic acid, oleic acid, capric acid, linoleic acid, linolenic acid, sorbic acid, myristic acid, undecanoic acid, naturally occuring fatty acid mixtures such as for example $C_{12}$ to $C_{14}$ or $C_{16}$ to $C_{18}$ fatty acid mixtures, acrylic acid, or methacrylic acid or combinations thereof. Additional suitable carboxylic acids are carboxylic acids having more than one carboxylic acid group such as oxalic acid, adipic acid, fumaric acid, maleic acid, itaconic acid, aconitic acid, succinic acid, malonic acid, suberic acid, azelaic acid, furan dicarboxylic acid, phthalic acid, terephthalic acid, diglycolic acid, glutaric acid, 1,2,3-propanetricarboxylic acid, 1,1,3,3-propanetetracarboxylic acid),1,3,3,5-pentanetetracarboxylic acid, 1,1,2,2-ethanetetracarboxylic acid, or 1,2,3,4-butanetetracarboxylic acid or combinations thereof. Anhydrides of carboxylic acids may also be used such as for example succinic anhydride, dianhydride of butanetetracarboxylic acid, phthalic anhydride, acetylcitric anhydride, maleic anhydride, itaconic anhydride, or aconitic anhydride.

The hydroxycarboxylic acids have at least one hydroxy group and at least one carboxylic acid group. Suitable hydroxycarboxylic acids include for example citric acid, isocitric acid, mucic acid, tartaric acid, hydroxymalonic acid, lactic acid, or malic acid. Additional hydroxycarboxylic acids include for example glyceric acid, bis(hydroxymethyl)propionic acid, or gluconic acid.

Alcohols useful as optional additional monomers are monohydric alcohols or polyols. Monohydric alcohols include for example methanol, ethanol, n-propanol, isopropanol, butanol, pentanol, hexanol, cyclohexanol, octanol, decanol, palmityl alcohol, or stearyl alcohol. Polyols include for example ethylene glycol, glycerol, oligoglycerol, erythritol, pentaerythritol, sorbitol, triethanolamine, polysaccharide, or polyvinyl alcohol.

The alcohols may also be added to $C_2$ to $C_4$ alkylene oxides to form alkoxylated monohydric alcohols or polyols. For example alkoxylated polyols such as polyethylene glycol, polypropylene glycol, or ethoxylated glycerol may be used as optional monomers.

Amines may also optionally be reacted. Amines include monoamines or polyamines. Suitable monoamines include for example $C_1$-$C_{22}$ alkyl or aryl amines such as methylamine, ethylamine, butylamine, diethylamine, cyclohexylamine, octylamine, stearyl amine, oleyl amine and palmitylamine, hydroxylamines such as N-(carboxyethyl)-hydroxylamine, N,N-di(carboxymethyl)hydroxylamine, tricarboxymethylhydroxylamine, ethanolamine, or diethanolamine. Polyamines include for example ethylenediamine, diethylenetriamine, triethylenetetraamine, hexamethylenediamine, diaminobutane, histamine, or polyvinylamine. The amines may also be added to $C_2$ to $C_4$ alkylene oxides to form alkoxylated amines.

As stated previously, the poly(amino acids) added to detergent solutions to inhibit corrosion include copolymers of amino acids and homopollers of amino acids. Preferably the poly(amino acids) added to the aqueous system are homopolymers. The homopolymers of amino acids are preferably used in detergent solutions which are essentially free of the water soluble silicates.

Preferred homopolymers of amino acids useful in the present invention are a reaction product of at least one compound selected from aspartic acid, glutamic acid, lysine, arginine, histidine, alanine, β-alanine, 4-aminobutyric acid, maleamic acid, ammonium salts of malic acid, or the ammonium salts of maleic acid. More preferably the homopolymers are a reaction product of at least one compound selected from aspartic acid, glutamic acid, lysine, maleamic acid, or the ammonium salts of maleic acid. Most preferably, the homopolymers are poly(aspartic acid).

Preferred copolymers of amino acids useful in the present invention are a reaction product of at least one first amino acid and at least one second amino acid. The preferred copolymers of amino acids have a molar ratio of the first amino acid to the second amino acid of from 1:99 to 99:1; preferably from 40:60 to 95:5; and more preferably from 70:30 to 95:5.

The first amino acid of the preferred copolymer is preferably selected from aspartic acid and glutamic acid. More preferably the first amino acid is aspartic acid.

The second amino acid of the preferred copolymer is preferably selected from the group consisting of glycine, alanine, valine, leucine, isoleucine, phenylalanine, tyrosine, tryptophan, serine, threonine, asparagine, glutamine, lysine, arginine, histidine, methionine, cystine, cysteine, proline, hydroxyproline, β-alanine, phosphoserine, hydroxylysine, ornithine, citrulline, homocysteine, cystathionine, and 4-aminobutyric acid, or combinations thereof. More preferably, the second amino acid is selected from glycine, alanine, leucine, threonine, isoleucine, phenylalanine, lysine, arginine, histidine, tyrosine, serine, threonine, or combinations thereof, and most preferably, selected from lysine, arginine, histidine, or combinations thereof.

Another embodiment of the present invention relates to the use of corrosion inhibitors comprising one or more homopolymers of amino acids and one or more pyrophosphates in aqueous systems. These corrosion inhibitors are effective in aqueous systems operated at pHs from 3 to 12.

The pyrophosphates may be added to the aqueous system together with the homopolymers of amino acids, or added separately to the aqueous system. If added separately, the pyrophosphates may be added before or after adding the homopolymers of amino acids, or may be added simultaneously with the homopolymers of amino acids. Preferably, the pyrophosphates are added together with the homopolymers of amino acids.

The total concentration of the one or more pyrophosphates added to the aqueous system is typically the minimum amount needed to inhibit corrosion. Typically, the concentration of the pyrophosphates is at least 0.1 mg/l, more preferably 0.5 to 100 mg/l, and most preferably 3 to 20 mg/l.

The total concentration of the homopolymers of amino acids added to the aqueous system to be treated is an effective amount to inhibit corrosion. Typically, the total concentration of homopolymers of amino acids is greater than 1 mg/l, preferably from 1 to 1000 mg/l, and most preferably from 1 to 100 mg/l.

Pyrophosphates, also known as dipolyphosphates, are condensed inorganic phosphates containing two phosphorus atoms. The pyrophosphates include for example the alkali metal or alkaline earth metal pyrophosphates, such as for example sodium pyrophosphate and potassium pyrophosphate.

In an additional embodiment of the present invention, we have discovered that certain homopolymers of amino acids, are effective as corrosion inhibitors in aqueous systems without the pyrophosphates at a pH of 7.5 or less; preferably at a pH of 6.5 or less. The certain homopolymers have a Mw greater than 1900; preferably greater than 5,000 and most preferably greater than 10,000.

Preferred homopolymers of amino acids useful with or without the pyrophosphates in aqueous systems are a reaction product of at least one compound selected from aspartic acid, glutamic acid, lysine, arginine, histidine, alanine, β-alanine, 4-aminobutyric acid, maleamic acid, the ammonium salts of maleic acid, or the ammonium salts of malic acid. More preferably the homopolymers are a reaction product of at least one compound selected from aspartic acid, glutamic acid, lysine, maleamic acid, the ammonium salts of maleic acid or the ammonium salts of malic acid. Most preferably, the homopolymers are poly(aspartic acid).

As mentioned previously aqueous systems as herein defined are meant to include water treatment systems and equipment used for detergent applications.

In water treatment systems, the corrosion inhibitors of the present invention are more effective in systems operated at a pH of from 3 to 12. The corrosion inhibitors are particularly suitable in some water treatment aqueous systems, such as cooling water systems, heat exchange equipment, reverse osmosis equipment, oil production operations, flash evaporators, desalination plants, and some paper making equipment, where the systems are frequently operated at pHs less than 7.5. The corrosion inhibitors are also effective in other water treatment systems, where the pH may vary depending on the part of the system. For example, in oil production operations, downhole, or below ground, the aqueous fluid has typically a pH less than about 6. However topside, or above ground, the aqueous fluid often has a pH greater than 6.

In equipment used for detergent applications, the corrosion inhibitors are more effective in detergent solutions having a pH from 8 to 11.

For water treatment systems, other additives may be added in addition to the corrosion inhibitors useful in the present invention. The other additives added will depend on the type of water treatment system. However, common other additives include, for example, scale inhibitors, additional corrosion inhibitors; metal deactivators, threshold agents, and precipitating agents.

Scale inhibitors include poly(acrylic acid), phosphinopoly(carboxylic acids), hydrolyzed poly(acrylonitrile), poly(methacrylic acid), poly(maleic acid), poly(acrylamide), or copolymers of acrylic acid, methacrylic acid, acrylamide, acrylamide propionic sulfonic acid, acrylamido propane sulfonic acid, alkyl acrylamide, styrene, or maleic acid, or combinations thereof.

Additional corrosion inhibitors which may be added to the aqueous system include for example water soluble zinc salts, phosphonates, nitrates, molybdates, tungstates, silicates, ethanolamines, fatty amines, or poly(carboxylic acids).

Metal deactivators which may be added to the aqueous system include for example benzotriazole, or bisbenzotriazole, derivatives of benzotriazole or tolyltriazole.

Threshold agents which may be added to the aqueous system include, for example, 2 phosphonobutane- 1,2,4-tricarboxylic acid, hydroxyethyldiphosphonic acid, hydrolyzed poly(maleic anhydride), or hydroxyphosphonoacetic acid. Precipitating agents which may be added include alkali metal carbonates.

The water treatment systems may also contain for example oxygen scavengers, antifoaming agents, or biocides.

For equipment used in detergent applications, the detergent solutions typically contain, in addition to the poly(amino acids) useful in the present invention, surfactants, builders, and inert diluents.

Suitable surfactants used in the detergent solutions include for example, anionic surfactants, such as from $C_8$ to $C_{12}$ alkylbenzenesulfonates, from $C_{12}$ to $C_{16}$ alkanesulfonates, from $C_{12}$ to $C_{16}$ alkylsulfates, from $C_{12}$ to $C_{16}$ alkylsulfosuccinates and from C 12 to $C_{16}$ sulfated ethoxylated alkanols and nonionic surfactants such as from $C_6$ to $C_{12}$ alkylphenol ethoxylates, from $C_{12}$ to $C_{20}$ alkanol alkoxylates, and block copolymers of ethylene oxide and propylene oxide. Optionally, the end groups of polyalkylene oxides can be blocked, whereby the free OH groups of the polyalkylene oxides can be etherified, esterified, acetalized and/or aminated. Another modification consists of reacting the free OH groups of the polyalkylene oxides with isocyanates. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide. The surfactants usable in the detergent solution can also have an amphoteric character and they can be soaps.

In general, the surfactants are present in the detergent solutions at a concentration of from 10 to 500 mg/l, preferably 50 to 250 mg/l.

Builders which may be present in the detergent solutions include for example phosphates, specifically, orthophosphates, pyrophosphates and especially sodium tripolyphosphate. Further examples of builders are the zeolites, sodium carbonate, polycarboxylic acids, nitrilotriacetic acid, citric acid, tartaric acid, the salts of the aforesaid acids and the monomeric, oligomeric or polymeric phosphonates.

In general, the builders are present in the detergent solutions at a concentration of from 50 to 1500 mg/l, preferably from 300 to 800 mg/l.

Inert diluents are compounds typically used in detergent formulations to disperse or suspend the other ingredients in the detergent formulation. Typical diluents include for example, inert solids such as sodium sulfate, or inert solvents such as water.

Other optional additives in the detergent solutions, may include graying inhibitors, bleaching agents, dye transfer inhibitors, optical brighteners, enzymes, additional other corrosion inhibitors, and perfumes.

The corrosion inhibitors, useful in the present invention are more effective in aqueous systems operating at temperatures of from 5° to 200° C.; preferably 15° to 95° C.

The corrosion inhibitors are effective in inhibiting corrosion in the presence of cations and anions which may be present in the aqueous system. Cations which may be present in the aqueous system include for example iron, zinc, manganese, and alkali and alkaline earth metals such as sodium, potassium, calcium, and barium. Anions which may be present in the aqueous system include for example carbonate, sulfate, sulfonate, phosphate, silicate, phosphonate, and chloride ions. These cations and anions may combine to form insoluble salts such as for example calcium carbonate, iron oxide, calcium phosphate, and zinc phosphate.

An added advantage to the corrosion inhibitors useful in the present invention is that they are partially or completely biodegradable.

Some embodiments of the invention will now be described in detail in the following Examples. In all examples where a molecular weight (Mw) is reported, the molecular weight was measured by gel permeation chromatography (GPC) using as a standard a 4500 Mw poly(acrylic acid). The abbreviations used in Tables 1–6 are defined in Table 7.

The corrosion inhibitors useful in the present invention were tested for their ability to inhibit corrosion in Examples 1–28. The test method used in Examples 1–28, measured the corrosion of a metal coupon completely immersed in a gently agitated test solution containing a corrosion inhibitor. The corrosion of the metal coupon was measured by analyzing the iron concentration in the test solution. Accordingly, in comparing two test solutions, the test solution having the lower iron concentration had a corrosion inhibitor which was more effective.

For each corrosion inhibitor tested, 200 g of test solution was prepared in an 8 ounce jar.

For Examples 1–17, a detergent test solution of the composition shown in Table 1 was used:
Table 1: Composition of Detergent Test Solution for Examples 1–17
200 mg/l Ca as $CaCO_3$
756 mg/l Detergent Slurry (as solids)
22 mg/l sodium silicate, $SiO_2/Na_2O=2.00$, if present
60 mg/l corrosion inhibitor to be tested, if present (total)
deionized water (balance)
The detergent test solution in Table 1, is typical of detergent solutions used in laundry or automatic dishwashing equipment for cleaning. The detergent slurry contained the following components shown in Table 2:
Table 2: Composition of Detergent Slurry:
5.50 weight percent $Na_2CO_3$ (builder)
4.00 weight percent Zeolite (builder)
2.06 weight percent Dodecyl Sulfate, sodium salt (surfactant)
1.03 weight percent Linear Alkyl Sulfonate (surfactant)
Balance Deionized water For Examples 18–28, a water treatment test solution was used. The water treatment test solution consisted of: 1) 179 g of a stock solution with a composition defined in Table 3, 2) corrosion inhibitor added in an amount to produce the desired concentration in the test solution, and 3) deionized water (balance). The composition of the stock solution is shown in Table 3.

TABLE 3

| Composition of Stock Solution | |
|---|---|
| Component | Amount Added |
| KCl | 3.18 g/2l |
| $CaCl_2.2H_2O$ | 23.74 g/2l |
| $MgCl_2.6H_2O$ | 31.30 g/2l |
| $BaCl_2.2H_2O$ | 0.90 g/2l |
| $SrCl_2.6H_2O$ | 3.54 g/2l |
| NaCl | 98.12 g/2l |
| deionized water | balance |

For test solutions containing a poly(amino acid) as a corrosion inhibitor the concentration of poly(amino acid) added was based on polymer in the acid form. For test solutions containing pyrophosphate, the concentration of pyrophosphate was based on $PO_4$.

After the test solutions were prepared, each was sparged with compressed air for 5 minutes. Following the sparge, the pH of each test solution was adjusted to either 5.5, 7.0, or 10.0 with dilute HCl or dilute NaOH.

The metal coupons used to measure corrosion inhibition were made of mild steel and obtained from Delta Technologies located in Holland, Pa. Each metal coupon had approximate dimensions of 68×13×1.2 mm and weighed approximately 10 g. The metal coupons, before being used, were prepared in the following manner: 1) rinsed with 2-propanol 2) rinsed with water, 3) buffed with cheese cloth in pumice stone, 4) rinsed with water, 5) rinsed with 2-propanol, and 6) dried with cheese cloth.

To measure corrosion inhibition, one metal coupon was placed in each jar of test solution. The jars of test solution were placed in a shaker at room temperature and shaken at slow speed for 20 hours (the metal coupon was completely immersed in the test solution). At the conclusion of the 20 hours, each coupon was removed from its jar and the corrosion products on the coupon were scraped into the test solution.

For examples 1–17, the detergent test solution was then acidified to a pH of 0.5 to dissolve large iron particles. After 10 days at a pH of 0.5, the pH of each test solution was raised to a pH of 4.5 to analyze for total iron. Each water treatment solution was analyzed for total iron without using any special procedure for dissolving iron particles. Each test solution was measured for total iron using the Hach DR/3000 spectrophotometer test method entitled "Iron, Total DR/3000 Procedure Code I.3" found in the Hach DR/3000 Spectrophotometer Manual.

Table 4 demonstrates that poly(amino acids) useful in the present invention are effective as corrosion inhibitors in a detergent solution containing surfactants and builders compared to a detergent solution containing no corrosion inhibitor (control). Table 4 shows that the poly(amino acids) are effective in inhibiting corrosion with and without sodium silicate present in the detergent solution. The sodium silicate is a common corrosion inhibitor in detergent solutions. The poly(amino acids) are also effective as corrosion inhibitors in detergent solutions in the presence of pyrophosphates.

Examples 4 to 11 demonstrate that homopolymers of aspartic acid ranging in molecular weight from 5330 to 16,300 are effective in inhibiting corrosion in detergent solutions. The homopolymers are particularly effective in inhibiting corrosion when sodium silicate is not present in the detergent solution (Examples 4 and 8).

Examples 12 to 17 demonstrate that copolymers of amino acids are effective in inhibiting corrosion in detergent solutions. Examples 12–13, 15 and 17 demonstrate that copolymers of amino acids are effective in inhibiting corrosion when sodium silicate is present in the detergent solution. The copolymers are also effective in inhibiting corrosion when sodium silicate is not present in the detergent solution (Examples 14 and 16).

The polyaspartic acid in Examples 4–11 was prepared from the thermal condensation reaction of a mixture of aspartic acid and 85 weight percent orthophosphoric acid to form polysuccinimide. In Examples 4–7, a mixture of 98.5 weight percent aspartic acid and 2.5 weight percent of the orthophosphoric acid was reacted. In Examples 7–11, a mixture of 80 weight percent aspartic acid and 20 weight percent orthophosphoric acid was reacted. After the reaction was complete in Examples 4–11, the orthophosphoric acid was washed from the polysuccinimide using water. The polysuccinimide in Examples 15–18 was then hydrolyzed at a pH of 10.8, at 90° C., for 30 minutes, using sodium hydroxide to form the poly(aspartic acid).

The copolymers of amino acids in Examples 12–17 in Table 4 were prepared from the thermal condensation reaction of amino acids. For each copolymer in Table 4, the amino acids were reacted in the proportions of 80 moles of the first amino acid shown in Table 4, under "Poly(amino acids)" (i.e., aspartic acid) to 20 moles of the second amino acid shown in Table 4 to form a reaction product. The reaction was performed using an acid catalyst of polyphosphoric acid. After the reaction was complete, the acid catalyst was removed from the reaction product by washing with water, and the reaction product was purified by dialysis. The purified reaction product was hydrolyzed at a pH of 10.8 with sodium hydroxide at 90° C. over 30 minutes.

TABLE 4

Corrosion Inhibition of Poly(amino acids) in Detergent Solutions[1]

| Example | Poly(amino acid) | Mw | Phosphate | Silicate[2] | Polymer Conc. (mg/l)[3] | Phosphate Conc. (mg/l)[4] | Conc. of Fe (mg/l) |
|---|---|---|---|---|---|---|---|
| Control | none | | none | none | 0 | 0 | 67.6 |
| 1 (comp) | none | | none | yes | 0 | 0 | 55.8 |
| 2 (comp) | none | | PYRO | none | 0 | 5 | 36.0 |
| 3 (comp) | none | | PYRO | yes | 0 | 5 | 36.8 |
| 4 | PASP | 5330 | none | none | 60 | 0 | 7.4 |
| 5 | PASP | 5330 | none | yes | 60 | 0 | 27.7 |
| 6 | PASP | 5330 | PYRO | none | 55 | 5 | 20.6 |
| 7 | PASP | 5330 | PYRO | yes | 55 | 5 | 23.4 |
| 8 | PASP | 16,300 | none | none | 60 | 0 | 6.3 |
| 9 | PASP | 16,300 | none | yes | 60 | 0 | 24.6 |
| 10 | PASP | 16,300 | PYRO | none | 55 | 5 | 23.5 |
| 11 | PASP | 16,300 | PYRO | yes | 55 | 5 | 35.8 |
| 12 | 87.7 ASP/12.3 TYR | 4360 | none | yes | 60 | 0 | 32.0 |
| 13 | 90.0 ASP/10.0 HISHCl | 3420 | none | yes | 60 | 0 | 15.4 |
| 14 | 84.6 ASP/15.4 PHE | 3190 | none | none | 60 | 0 | 17.9 |
| 15 | 84.6 ASP/15.4 PHE | 3190 | none | yes | 60 | 0 | 16.1 |
| 16 | 87.1 ASP/12.9 LEU | 2980 | none | none | 60 | 0 | 35.0 |
| 17 | 87.1 ASP/12.9 LEU | 2980 | none | yes | 60 | 0 | 6.6 |

[1]All test solutions were adjusted to a pH of 10 before starting the corrosion test.
[2]When silicate was present, 22 mg/l of sodium silicate, was in the detergent test solution.

TABLE 4-continued

| | | | | | Polymer Conc. | Phosphate Conc. | Conc. of Fe |
|---|---|---|---|---|---|---|---|
| Example | Poly(amino acid) | Mw | Phosphate | Silicate[2] | (mg/l)[3] | (mg/l)[4] | (mg/l) |

Corrosion Inhibition of Poly(amino acids) in Detergent Solutions[1]

[3]Concentration of polymer, as polymer in acid form, in detergent test solution.
[4]Concentration of phosphate, as $PO_4$, in detergent test solution.

Table 5 shows that a corrosion inhibitor containing one or more homopolymers of amino acids and one or more pyrophosphates is effective in inhibiting corrosion at a wide range of aqueous pHs.

Table 5 demonstrates that when the corrosion inhibitor is a combination of poly(aspartic acid) and pyrophosphate as in Examples 20, 22, 24, 26, and 28 the ability of the polyaspartic acid to inhibit corrosion improves significantly compared to the polyaspartic acid alone at a given Mw (Examples 19, 21, 23, 25 and 27), or the phosphate alone (Comparative Example 18).

Table 5 shows that the combination of poly(aspartic acid) and pyrophosphate inhibits corrosion better than poly(aspartic acid) alone at pHs of 5.5 to 10. The poly(aspartic acid) and pyrophosphate is also more effective than poly(aspartic acid) alone when the concentration of the poly(aspartic acid) is reduced to 100 mg/l to 10 mg/l (Examples 21–26).

The polyaspartic acid in Examples 21–28 was prepared as in Examples 4–11, except that the composition of the reaction mixture of aspartic acid and the othophosphoric acid was varied to achieve the Mws reported in Table 5. The compositions of the reaction mixtures were the following:

Examples 21–26—90 weight percent aspartic acid, and 10 weight percent of the orthophosphoric acid Examples 27–28—80 weight percent aspartic acid, and 20 weight percent orthophosphoric acid After the reaction was complete in Examples 21–28, the orthophosphoric acid was washed from the polysuccinimide using water to completely remove the acid. The polysuccinimide was then hydrolyzed at a pH of 10.8, at 90° C., for 30 minutes, using sodium hydroxide to form the poly(aspartic acid).

TABLE 5

Corrosion Inhibition with Homopolymers of an Amino Acids and Pyrophosphates

| Example | Corrosion Inhibitor | Mw of Polymer | Polymer Conc. (mg/l)[5] | Phosphate Conc. (mg/l)[6] | Concentration of Fe (mg/l) | | |
|---|---|---|---|---|---|---|---|
| | | | | | 5.5 pH | 7.0 pH | 10.0 pH |
| Control | no polymer | — | — | — | 25.0 | 32.5 | 27.5 |
| 18 (comp) | PYRO | — | 0 | 5 | — | 30.0 | — |
| 19 | PASP | 1930 | 100 | 0 | 19.0 | 23.0 | 27.5 |
| 20 | PASP/PYRO | 1930 | 100 | 5 | 15.0 | 15.0 | 19.0 |
| 21 | PASP | 7970 | 100 | 0 | 15.0 | 20.0 | 12.5 |
| 22 | PASP/PYRO | 7970 | 100 | 5 | 17.5 | 15.0 | 9.0 |
| 23 | PASP | 7970 | 25 | 0 | — | 27.5 | — |
| 24 | PASP/PYRO | 7970 | 25 | 5 | — | 21.0 | — |
| 25 | PASP | 7970 | 10 | 0 | — | 30.0 | — |
| 26 | PASP/PYRO | 7970 | 10 | 5 | — | 22.5 | — |
| 27 | PASP | 16,300 | 100 | 0 | — | 15.0 | — |
| 28 | PASP/PYRO | 16,300 | 100 | 5 | — | 12.5 | — |

[5]Concentration of polymer, as polymer in acid form, in test solution
[6]Concentration of phosphate, as $PO_4$, in test solution The polyaspartic acid in Examples 19–20 was prepared from the reaction of maleic anhydride and ammonia to form polysuccinimide. A 30 weight percent aqueous ammonia solution was used as a diluent in the reaction. The mole ratio of ammonia to the maleic anhydride used was 1.05 moles ammonia to 1 mole maleic anhydride. The diluent was used at a mole ratio of 0.13 moles ammonium hydroxide to 1 mole maleic anhydride. The polysuccinimide formed from the reaction was then hydrolyzed at an aqueous pH of 10.8 at 90° C. for 30 minutes with sodium hydroxide to form the poly(aspartic acid). In the preparation process the maleic anhydride and ammonia reacted to form an ammonium salt of maleic acid, which then condensed to form the polysuccinimide.

Table 6 demonstrates that homopolymers of amino acids are effective as corrosion inhibitors at a pH less than 7.5 and a molecular weight greater than 1900. Table 6 shows that the ability of a homopolymer of aspartic acid (polyaspartic acid) to inhibit corrosion, improves as the molecular weight is increased (Examples 19, 21, and 27). The poly(aspartic acid), when compared to the no polymer control is effective in inhibiting corrosion at a pH of 5.5 and 7.0. Table 6 shows that the poly(aspartic acid) provides corrosion inhibition at concentrations greater than or equal to 10 mg/l (Examples 21, 23, and 25).

TABLE 6

Corrosion Inhibition with Homopolymers of Amino Acids

| Example | Corrosion Inhibitor | Mw of Polymer | Polymer Conc. (mg/l)[7] | Concentration of Fe (mg/l) 5.5 pH | 7.0 pH |
| --- | --- | --- | --- | --- | --- |
| Control | no polymer | — | — | 25.0 | 32.5 |
| 19 | PASP | 1930 | 100 | 19.0 | 23.0 |
| 21 | PASP | 7970 | 100 | 15.0 | 20.0 |
| 23 | PASP | 7970 | 25 | — | 27.5 |
| 25 | PASP | 7970 | 10 | — | 30.0 |
| 27 | PASP | 16,300 | 100 | — | 15.0 |

[7]Concentration of polymer, as polymer in acid form, in test solution

TABLE 7

Abbreviations Used in Tables 1–6

| Abbreviation | Definition |
| --- | --- |
| comp | comparative |
| PYRO | sodium pyrophosphate |
| PASP | poly(aspartic acid) |
| ASP | mole percent aspartic acid |
| TYR | mole percent tyrosine |
| HISHCl | mole percent histidine hydrochloride |
| PHE | mole percent phenylalanine |
| LYS | mole percent lysine |
| LEU | mole percent leucine |

We claim:

1. A method of inhibiting corrosion, comprising: contacting ferrous metals in an aqueous system with greater than 1 milligram per liter of at least one homopolymer selected from the group consisting of poly(aspartic acid) and poly(glutamic acid) and from 0.5 milligrams per liter to 100 milligrams per liter of one or more pyrophosphates; and inhibiting corrosion of the ferrous metals;

wherein the aqueous system is operated at a pH from 3 to 12.

2. The method of claim 1, wherein: the homopolymer is poly(aspartic acid).

* * * * *